Sept. 14, 1943. E. P. BULLARD, 3D 2,329,246
FEED DRIVE MEANS FOR MACHINING CONCAVE AND CONVEX SURFACES
Filed March 30, 1939 3 Sheets-Sheet 2
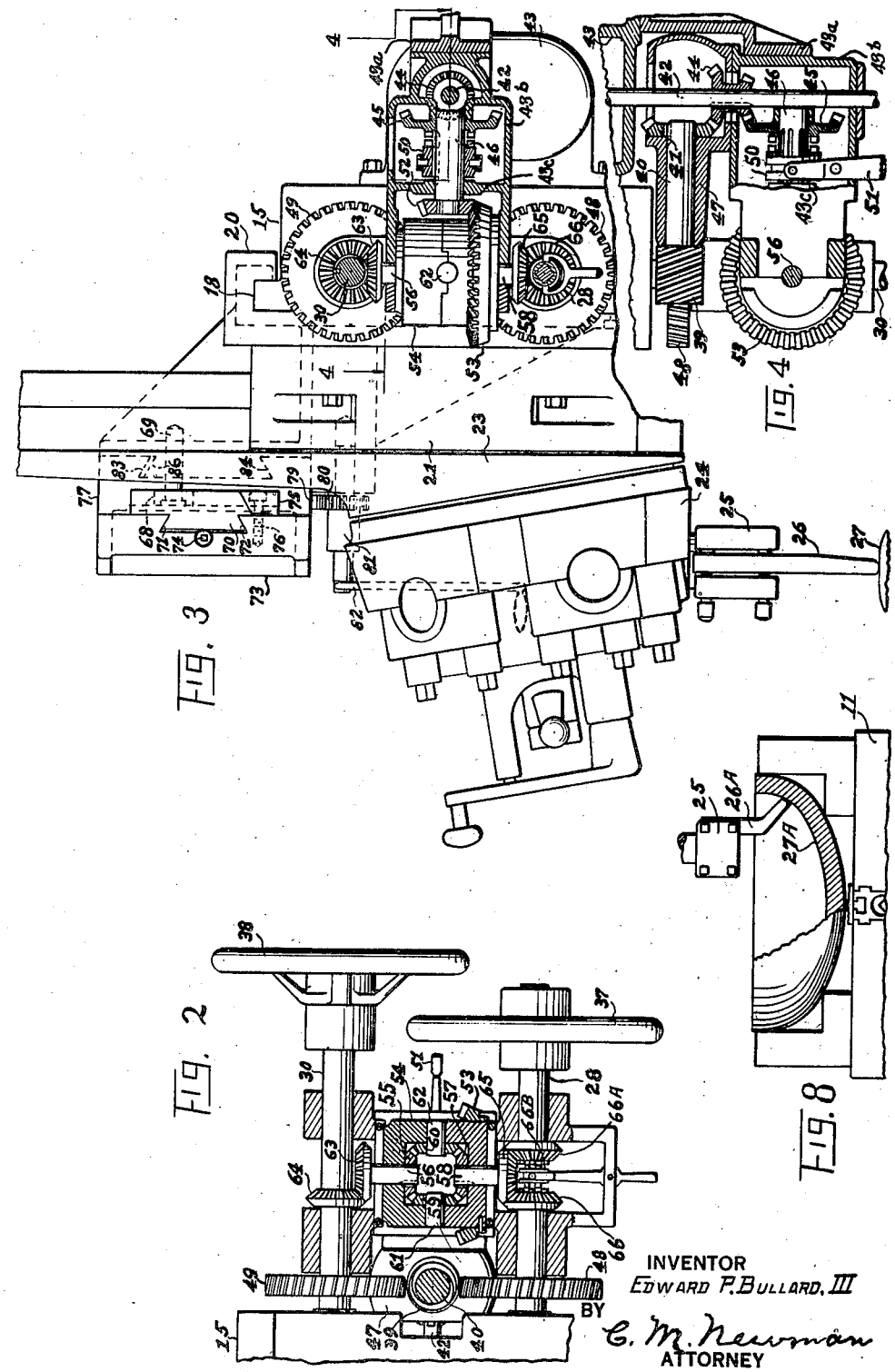
INVENTOR
EDWARD P. BULLARD, III
BY
C. M. Newman
ATTORNEY

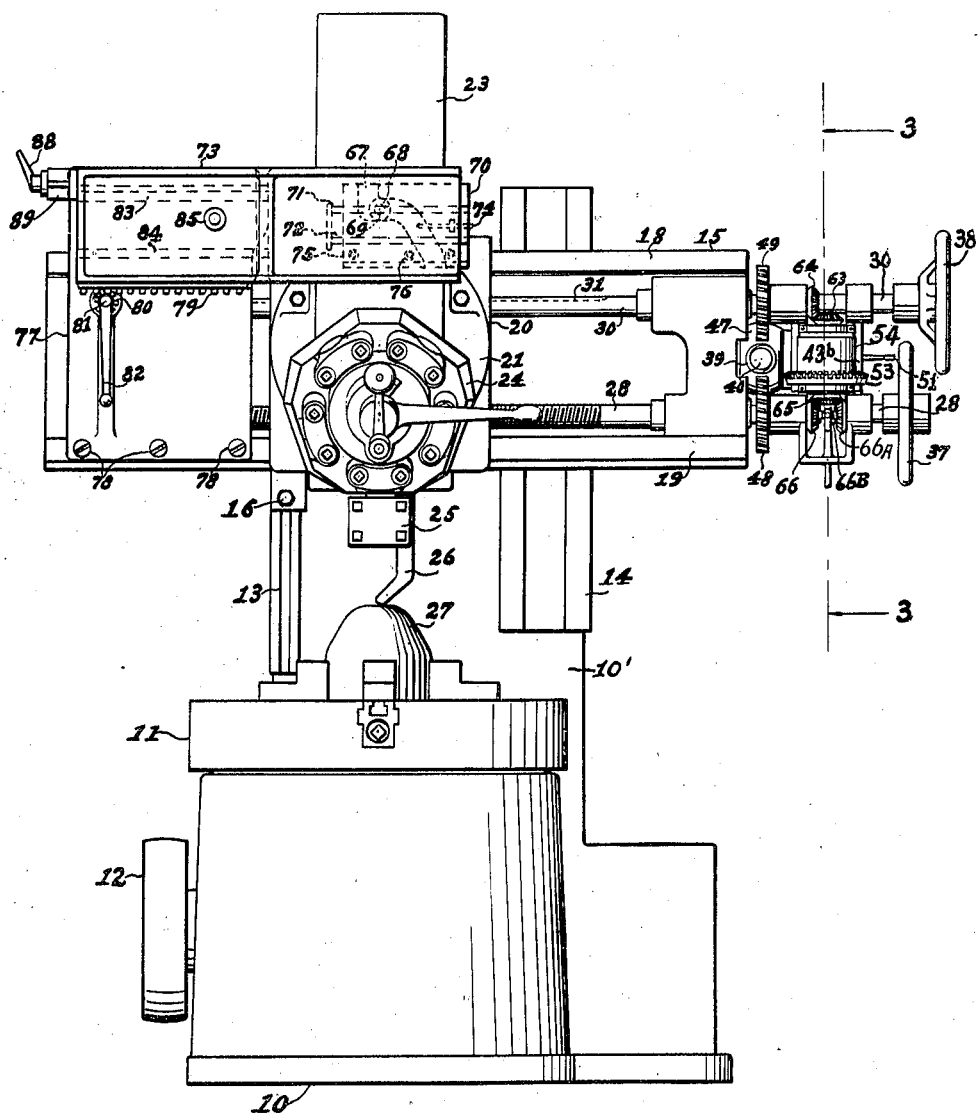

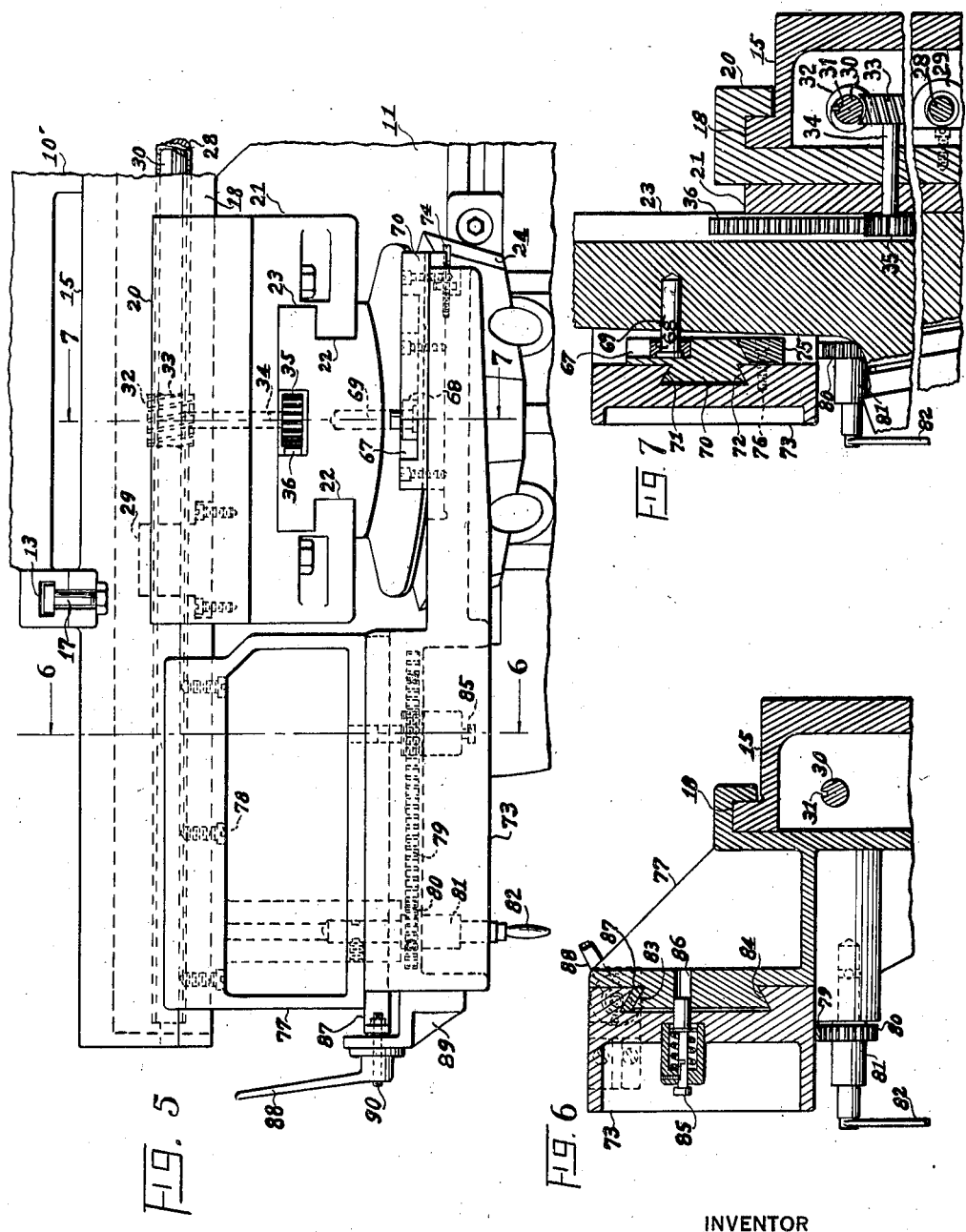

Patented Sept. 14, 1943

2,329,246

UNITED STATES PATENT OFFICE 2,329,246

FEED DRIVE MEANS FOR MACHINING CONCAVE AND CONVEX SURFACES

Edward P. Bullard, III, Fairfield, Conn., assignor to The Bullard Company, a corporation of Connecticut Application March 30, 1939, Serial No. 264,949

18 Claims. (Cl. 82—19)

This invention relates to a means for machining irregular surfaces of revolution and more particularly to a means for moving a cutting tool over a rotating work piece having either a concave or convex surface.

The feed drive means of the present invention is intended for, and illustrated as a mechanism particularly adapted to machine tools in which a tool element is under the optional control of two driving means emerging from a single source.

This invention is applicable, in general, to machine tools in which a tool element may be moved in two lines of direction at an angle of 90 degrees with respect to each other.

The general object of the invention is to provide a feed drive means simple and efficient and with a wide range of usefulness and with a minimum of interference with the normal operation of the machine.

Another object is to provide an improved continuous drive which will permit a tool element, mounted for motion in any direction, to follow a cam throughout an arc of 90 degrees.

It is another object to provide means to impart motion to a tool element from either one of two sources, or both, in a varying degree, as required, depending upon the direction in which the tool element moves.

It is an object to connect two sources of tool drive by a mechanism commonly known as a differential which partakes of certain advantages to permit a varying degree of effectiveness of the two sources.

It is a particular object of the invention to control the movement of the tool element by a cam in conjunction with a differential effecting in a varying degree two sources of tool movement.

It is a further object to provide means, when the forming attachment is not required, whereby certain elements of the mechanism may be readily moved so as not to interfere with the normal operation of the machine.

Another object is to provide means to return the removed elements and accurately lock them in their former relationship, permitting operation to be resumed that requires the differential mechanism.

A still further object is to provide a selective control whereby a machine tool may be either operated in a normal manner or with the differential mechanism.

With the foregoing and other objects in view, the invention consists of a novel differential connection between two drive means for imparting movement to a tool element; said movement being under the control of a cam conforming to a desired contour.

In the drawings:

Figure 1 represents a front view of a vertical machine tool to which the invention is applied, only the essential parts being shown.

Figure 2 represents an enlarged view, partly in section, of the mechanism on the right hand end of the cross rail.

Figure 3 represents an enlarged side view of a portion of the machine tool, partly in section, taken on the line 3—3 of Figure 1.

Figure 4 represents a section taken on the line 4—4 of Figure 3.

Figure 5 represents an enlarged top plan view of a portion of the cross rail and head to which the invention is applied.

Figure 6 represents a fragmentary section taken on the line 6—6 of Figure 5;

Figure 7 represents a fragmentary section taken on the line 7—7 of Figure 5; and Figure 8 discloses, partly in section, an illustrative work piece of another form having a concave surface which may be tooled on a machine equipped with the improved feed drive means.

Referring to the drawings, the invention is depicted as applied to a vertical turret lathe of the type shown and described in the Bullard Patents Nos. 683,592, 1,690,568 and 1,749,374. It is to be understood the invention is not limited to the type of machine shown but is applicable to any machine tool in which the movement of the tool head is effected by a feed rod and a feed screw; the movement produced by one being normally at right angles to the movement produced by the other.

Referring more particularly to Figure 1, the lathe comprises a base 10 provided with a horizontal chuck table 11 rotatable about a vertical axis. Driving means, both for the table and tool feed, may be provided from a pulley 12 or other means.

A standard 10' rising upwardly from the base 10 is adapted to support vertical slideways 13 and 14 upon which is mounted a crossrail 15; means being provided, such as bolts 16 and 17 (Figure 5), for clamping the crossrail in position to accommodate work of varying height secured to the table 11. The crossrail is provided with suitable horizontal ways 18 and 19 upon which a saddle 20 is slidably mounted. A swivel 21, bolted to the saddle 20, is provided with slideways 22 (Figure 5) to receive a turret slide 23 upon which is mounted a tool holding turret 24. This turret carries a holder 25 in which may be secured a tool 26 adapted to the needs of a work piece 27. The mechanism for imparting horizontal movement to the saddle 20, turret slide 23 and turret 24 includes a feed screw 28 journaled in one end of the crossrail 15 and engaging a hollow threaded nut 29 (Figures 5 and 7) secured to said saddle 20. The arrangement being such that rotation of the feed screw within the nut will effect longitudinal movement to the saddle. A feed shaft 30 is likewise journaled in the end portion of the crossrail 15 and a worm 32 is keyed thereto for rotation therewith. The worm 32, through a worm gear 33, a shaft 34, and a pinion 35, engages a rack 36 to impart vertical motion to the turret slide 23.

Handwheels 37 and 38 are provided upon the ends of the feed screw 28 and feed shaft 30 respectively by which an operator can bring the tool to its final adjustment with respect to the work piece.

A worm 39 is secured to one end of a shaft 40 (Figure 4) upon the other end of which is secured a bevel gear 41. A shaft 42, parallel to the feed shaft 30 and the feed screw 28 and positioned midway between them, is journaled in a casing 43 which is secured to the back of the crossrail 15. The casing 43 contains a reversible feed driving means, not shown, for the shaft 42. Since the invention is not concerned with the driving means of the shaft 42, it will suffice to say the shaft may be driven from the main driving pulley, either forward or in reverse and at different speeds by a conventional speed change gearing to permit a variation in the cutting feed of the tool. Keyed to the shaft 42 is a double gear 44. One element of the gear 44 constitutes a primary driving means for the screw 28 and the shaft 30, and drives the worm 39 through the bevel gear 41 keyed to the shaft 40. The other element of gear 44 drives a clutch bevel gear 45 running free on a shaft 46, which gear 45 constitutes a portion of a secondary driving means for screw 28 and shaft 30. The shaft 40 is journaled in an arm 47 adapted to swing about the shaft 42 and normally positioned to hold the worm 39 in a disengaged neutral position between two worm gears 48 and 49, secured upon the feed screw 28 and the feed shaft 30 respectively. The worm 39 is adapted to be swung up, or down, to mesh with either of the before-mentioned worm gears 48 and 49. It is obvious the worm 39 can engage only one of the worm gears 48 and 49 at a time. Thus, when the worm 39 engages the worm gear 48, the tool head 24 and the tool 26 will be moved in a horizontal direction. Likewise, when the worm 39 engages the gear 49, the tool head 24 and the tool 26 will be moved in a vertical direction.

The machine described thus far is of conventional design and this invention provides a mechanism for imparting a simultaneous operation of the feed screw and the feed shaft in a varying degree of effectiveness to allow a tool to deviate from the horizontal and the path that turret slide 23 is required to follow by the bearings in the swivel 21, and to follow the contour prescribed by a cam having the desired form. The invention includes a connection between the feed screw 28 and the feed shaft 30 comprising a differential (see Figure 2).

It will be understood the worm 39 is in a neutral position, with respect to the worm gears 48 and 49, during the operation of the differential.

As previously mentioned, the double gear 44 drives the clutch bevel gear 45 rotating freely upon the shaft 46.

Referring to Figs. 3 and 4, a bracket 43a, removably fastened to the casing 43, is adapted to support a removable housing 43b of the attachment comprising the invention. The housing 43b is adapted to be bolted or otherwise removably mounted on the casing 43 in which the feedworks transmission of the lathe is located. The shaft 46, on which the clutch gear 45 is journaled, is supported within housing 43b by a bearing in a partition 43c of said housing.

The clutch bevel gear 45 is provided with a clutch face for engagement by a clutch sleeve 50 splined upon the shaft 46 and adapted to be shifted into engagement by a lever 51. When it is desired to operate the differential, the lever 51 is moved to engage the clutch sleeve 50 with the clutch on the bevel gear 45. Rotation of the shaft 42 will now rotate the shaft 46 and a pinion 52 keyed thereto (Figure 3). The pinion 52 meshes with a bevel gear 53 surrounding and secured to a differential housing 54. The housing 54 contains the usual arrangement of gears. A gear 55 (Figure 2) is keyed to an uprising shaft 56 that extends through the housing 54 and a wall of housing 43b and a similar gear 57 is keyed to a shaft 58 that extends downwardly through the housing 54 and another wall of housing 43b. The gears 55 and 57 are adapted to mesh with both bevel gears 59 and 60 running free on their respective stub shafts 61 and 62 positioned at right angles to the shafts 56 and 58. Upon the upper end of the shaft 56 is secured a bevel gear 63, meshing with a companion gear 64 keyed to the feed shaft 30. Likewise upon the lower end of the shaft 58 is secured a bevel gear 65 meshing with clutch gears 66 and 66A freely mounted upon the feed screw 28. The clutch gears 66 and 66A are engageable with a shiftable clutch element 66B splined upon the feed screw 28, whereby the direction of rotation of the feed screw may be changed by engaging the clutch element with either one of the clutch gears 66 or 66A. A suitable control lever may be utilized for shifting this clutch element manually. Thus, it will be seen the rotation of the housing 54 will rotate both the feed shaft 30 and the feed screw 28, but owing to the differential arrangement, the feed shaft 30 and the feed screw 28 may rotate at different speeds, or one may remain idle while the other is driven by the housing 54. To control the amount of tool feed to be imparted to the tool by the feed screw 28, or the feed shaft 30, or the combined feed of both, the invention includes a cam path 67 (Fig. 1) conforming to the contour of the finished work piece. The cam path 67 engages a roller 68 rotatably mounted on a stud 69 rigidly secured to the turret slide 23 (Fig. 7). The cam path is formed in a block 70 adjustable in a pair of slideways 71 and 72 formed in a cam carrier 73. By rotating a screw 74 (Fig. 1), the block 70 may be adjusted horizontally and when properly positioned may be secured by a binder clamp 75 secured by screws 76. The cam carrier 73 is slidably mounted in dovetailed ways in a support 77, said support embracing the upper slide way 18 (Figure 6) of the cross rail 15 and secured to the lower slide way 19 by bolts 78. A rack 79 (Fig. 1), secured to the lower face of the cam carrier 73, engages a pinion 80, secured to a stud 81, in the support 77. Rotation of a crank 82, secured to the stud 81, will move the cam carrier 73 horizontally on ways 83 and 84. It will be noted the cam path 67 is open at the upper and lower ends allowing the roller 68 to be moved clear of the cam block 70. While the roller 68 is out of the cam path 67, the cam carrier 73 may be moved to the left in the slide ways 83 and 84 by the crank 82 so as to be free from interference with any subsequent movement of the turret slide 23. When it is desired to reinstate the roller 68 in the cam path, 67, the cam carrier 73 is moved by rotation of the crank 82 to position the opening of the cam path in alignment with the roller and by operation of the feed screw 28 and feed shaft 30, the roller is again located in the desired position in the path. In order that the roller may be returned to the precise position in the cam path, after having been removed therefrom, a lockpin arrangement 85 is provided in the cam carrier 73 engaging a bore 86 in the support 77. Thus the cam carrier 73 may be locked in fixed position with respect to the support 77.

The cam carrier may be rigidly mounted in the ways 83 and 84, by a taper gib 87 (Figures 5 and 6) positioned between the way 83 and the abutting surface of the support 77.

If it is desired to move the cam carrier 73 the taper gib 87 must first be loosened by a lever and screw arrangement located on the end of the cam carrier. A partial rotation of a lever 88, (Fig. 5) rotatably mounted in a bracket 89, acting upon a screw 90, secured to the end of the gib 87, will tend to pull the taper gib out sufficient to allow easy movement of the cam bracket 73 by the crank 82.

The operation of the mechanism, as applied to the machine illustrated in the application, is as follows: A work piece, having approximately the contour of a finished piece, is secured in the table 10. It will be noted that the contour varies from the horizontal down an incline to the vertical, or through an arc of 90 degrees. The usual operation of the tool head is through the worm 39 meshing with either one of the worm gears 48 or 49. When contour cutting is desired, the worm 39 is kept in neutral, as illustrated.

The clutch element 66B on the feed screw 28 will be in position to effect movement of head 24 to the right as viewed in Fig. 1. Power applied to the pulley 12 will rotate the table and work piece and also, as before mentioned, the feed driving shaft 42 at the rear of the machine. It is assumed the tool, as shown in Figure 1, would be at the beginning of the cut. Moving the lever 51 to engage the clutch element 50 with the rotating clutch gear 45 on the shaft 42, will rotate the gear 53 and the differential housing 54 causing rotative force to be imparted to the gears 64 and 66 tending, in this example, to rotate the feed shaft 30 to feed the tool down and the feed screw 28 to feed the tool to the right. The roller 68, laying in a horizontal plane in the cam path, precludes the down feed of the tool, preventing the feed shaft 30 from revolving, the differential action of the mechanism allows the feed screw 28 to revolve, feeding the tool to the right. Continued rotation of the feed screw will move the roller to the curved and inclined portion of the cam path allowing both the feed screw and the feed shaft to become operative until the roller reaches the perpendicular portion of the cam path.

The feed screw has now become inoperative, the tool feeding down, from the action of the feed shaft 30 alone, to the end of the cam path when the feed may be stopped by the operator or automatically. It will be seen the tool has followed the cam through an arc of 90 degrees without disconnecting the clutch 50 and has produced the desired contour on the finished piece 27. A reverse movement of the shaft 42 will return the cam roll to the upper portion of the cam path facilitating the removal and replacement of the work piece 27.

Figure 1 discloses a work piece with the tool operating to machine a convex surface. It is desirable in some instances to machine a concave surface such as the internal surface of a work piece 27A illustrated in Figure 8. It being only necessary to substitute for the cam plate 70 (Figure 1) a cam plate provided with a groove corresponding to the finished work piece. In this example the feed shaft 30 would be rotated to move a tool 26A downward and the feed screw 28 would be rotated to move the tool to the left to the center of rotation of the work piece. Thus the compounded motions of the feed shaft and feed screw under control of a cam groove would cause the tool to produce the desired concave surface on the work piece. Cam plates may be provided in which the cam groove may assume various forms for different contours of work pieces. The groove may curve from the horizontal downward to the right or left or curve from the horizontal upward to the right or left. The tool 26 may be caused to move horizontally either right or left depending upon the engagement of the clutch element 66B on the feed screw 28 with either the clutch gear 66 or 66A, also the feed shaft 30 may be rotated to cause the tool to move either upward or downward depending upon the direction of rotation of the driving shaft 42 which governs the rotation of the differential housing 54. Thus the tool may be guided through any 90 degree angle.

When it is desired to use the machine without the forming attachment, the clutch 50 is disengaged from the clutch gear 45, and the clutch element 66B is retained in a neutral position. The worm 39 is engaged with the worm gear 48, or 49, to move the roll 68 out of the cam path. The lockpin 85 is withdrawn from the bore 86 in the support 77 and the lever 88 is rotated to loosen the gib 87. The cam carrier 73 is now free to be moved to the left by the rotation of the crank 82 so as to be out of the way of the roll 68 on the slide 23.

From the foregoing, it will be seen that the mechanism provides a simple, efficient and effectual mechanism for properly carrying out the objects of the invention. It will be understood the apparatus may assume various modifications and changes and the full use of equivalents may be resorted to without departing from the spirit and scope of the invention as outlined in the appended claims.

Having thus described my invention, what I claim and desire to secure by Letters Patent is:

1. In a metal working machine tool for machining irregular surfaces of revolution, a tool holding element; a cam for controlling the movement of said tool-holding element; a feed screw adapted to impart a rectilinear movement to said element; a feed shaft adapted to impart a rectilinear movement transversely to the first movement; common means for driving said screw and shaft; inter-connected driving means between the feed shaft and feed screw, independent of the drive between shaft and screw and said common means, but driven by said common means and including a differential gear unit adapted to allow said feed shaft and/or said feed screw to operate at different relative speeds, whereby to impart movement to said tool holding element independently or collectively under the control of said cam.

2. In a machine tool for machining irregular surfaces of revolution, a tool holding element; a slide for supporting said tool holding element; a saddle for supporting said slide for movement therein; a cross rail for carrying said saddle for horizontal movement thereon; a feed shaft for imparting movement to said slide along said saddle; a feed screw for imparting horizontal movement to said saddle; a cam roll secured to said slide adapted to engage a cam path in a cam plate stationary with respect to said cross rail; common means for driving said screw and shaft; and inter-connected driving means between said shaft and screw, independent of the drive between said screw and shaft and said common means, but driven by said common means including a differential gear unit permitting said feed shaft and said feed screw to impart movements to said slide and saddle, said movements being governed by said cam path.

3. In a machine tool for machining irregular surfaces of revolutions, a tool holding element; a slide for supporting said tool holding element; a saddle for supporting said slide for movement therein; a cross rail for carrying said saddle for horizontal movement thereon; a feed shaft for imparting movement to said slide; a feed screw for imparting horizontal movement to said saddle; a cam roll secured to said slide adapted to engage a cam path in a cam plate stationary with respect to said cross rail; a differential gear unit including a housing; a driving means for imparting rotation to said housing; said housing being mounted on two endwise opposed shafts extending thereinto, each of said opposed shafts being provided with gears meshing with bevel gears rotatably mounted on shafts secured in said housing at right angles to said opposed shafts, the outer end of one opposed shaft being provided with means for driving said feed shaft, the outer end of the other opposed shaft being provided with means for driving said feed screw; said differential gear unit permitting said feed shaft and feed screw to impart movements to said slide and saddle from said first driving means singly or collectively, said movements being controlled by said cam path.

4. In a machine tool for machining irregular surfaces of revolution, a cross rail; a saddle mounted thereon for horizontal movement; a slide mounted in said saddle for movement along a path intersecting the path of movement of said saddle; a cam roll attached to said slide; a cam plate; a cam path in said plate adapted to guide the cam roll; a cam plate carrier for said cam plate; separate feed driving shafts for imparting movement to said slide and saddle; common means for driving said shafts; means between said feed driving shafts, independent of the drive between said shafts and said common means, but driven by said common means and including a differential gear unit adapted to impart movements to said slide and saddle governed by said cam path; and means for adjusting said cam plate with respect to said cam plate carrier.

5. In a machine tool for machining irregular surfaces of revolution, a cross rail; a saddle mounted thereon for horizontal movement; a slide mounted in said saddle for movement along a path intersecting the path of movement of said saddle; a cam roll attached to said slide; a cam plate; a cam path in said plate to guide said cam roll, said path being open at both ends to permit said roll to move free from said cam path; a cam plate carrier slidably mounted on said cross rail; means for moving said cam plate carrier and cam plate from engagement with said roll; and separate means for adjusting said cam plate independently of the means for moving said cam plate carrier.

6. In a machine of the character described, a cross rail; a saddle mounted thereon for horizontal movement; a slide mounted in said saddle for movement along a path intersecting the path of movement of said saddle; a cam roll attached to said slide; a cam plate having thereon a cam path to guide said roll, said cam path being open at both ends to permit said roll to move free from said cam path; a cam plate carrier shiftable on said cross rail; means for moving said cam plate carrier to disengage the cam roll from the cam path; and relocating means to relocate said cam plate carrier in a predetermined position with respect to said cross rail, whereby upon the return of the cam roll into the cam path said apparatus attains the setting to that before removal of said cam roll from said cam path.

7. In a machine of the character described, a work holder, means for rotating said work holder, a cross rail adjustable with respect to the work holder, a saddle mounted for horizontal movement upon said cross rail, a slide provided with tool holding means mounted for movement in said saddle, a cam roll secured to said slide, a movable member mounted to slide horizontally with respect to said cross rail, a cam plate adjustably mounted in said member, having thereon a cam path in engagement with said cam roll, a feed shaft adapted to impart movement to said tool holding means, a feed screw adapted to impart horizontal movement to said saddle, an inter-connecting drive means between said feed shaft and feed screw operable by a differential gear unit to impart rotation to said feed shaft and feed screw, in turn to impart movements to said tool holding means, said movements being under the control of said cam path, and a reversible drive for said differential gear unit including a manually controlled means for engaging and disengaging said drive.

8. In a machine of the character described, a work holder, means for rotating said work holder, a cross rail adjustable with respect to said work holder, a saddle mounted for horizontal movement upon said cross rail, a slide provided with tool holding means mounted for rectilinear movement in said saddle, a cam roll secured to said slide, a movable member mounted to slide horizontally with respect to said cross rail, a cam plate adjustably mounted in said member, having thereon a cam path in engagement with said cam roll, a feed shaft adapted to impart movement to said tool holding means in said saddle, a feed screw to impart horizontal movement to said saddle, clutch means associated with said feed screw to reverse the rotation thereof without affecting the rotation of said feed shaft, interconnecting drive means between said feed shaft and feed screw operable by a differential gear unit to impart rotation to said feed shaft and feed screw, in turn to impart movements to said tool holding means, said movements being under the control of said cam path, and a reversible drive for said differential including a manually controlled means for engaging and disengaging said drive.

9. In a machine of the character described, a rotatable work holder, a cross rail, a saddle mounted for horizontal movement thereon, a slide mounted for movement in said saddle, tool holding means associated with said slide to operate with respect to said work holder, a feed screw adapted to impart horizontal movement to said saddle, a feed shaft adapted to impart movement to said slide, common means for driving said screw and shaft, an inter-connected driving means between said screw and shaft independent of the drive between said screw and shaft and said common means, but driven by said common means including a differential gear unit for said shaft and screw, means for reversing the rotation of said inter-connected driving means, independent means for reversing the rotation of said screw, a cam plate secured to said cross rail provided with a cam groove and a cam roll secured to said slide and in engagement with said cam groove for guiding said tool holding means.

10. In apparatus for machining irregular surfaces of revolution comprising in combination, a tool carrier; independent feed drive means for moving said tool carrier along intersecting paths; and primary means for driving said feed drive means; a removable attachment including secondary means for driving said feed drive means, said secondary means being driven by said primary means but independent of the drive between said primary and said feed drive means, said secondary driving means being adapted to drive said feed drive means in proportion to the resistance encountered by said drive means while moving said tool carrier along a predetermined path.

11. In a metal-working machine for machining irregular surfaces of revolution comprising in combination, a tool-holding element; a feed drive means for imparting movement to said tool-holding element; an independent feed drive means for imparting movement to said tool-holding element transversely to the first movement; and primary means for driving said feed drive means; an attachment comprising secondary means including a differential gear unit for driving said feed drive means, said secondary means being driven by said primary means but independent of the drive between said primary and said feed drive means, said secondary means being adapted to drive said feed drive means in proportion to the resistance encountered by said feed drive means while moving said tool-holding element along a predetermined path.

12. In a metal-working machine for machining irregular surfaces of revolution comprising in combination, a tool-holding element; independent feed-drive means for moving said element along intersecting paths; and primary means for driving said feed drive means; an attachment including a differential gear unit for driving said feed drive means, said differential gear unit being driven by said primary means but independent of the drive between said primary means and said feed drive means, said differential gear unit being adapted to drive said feed drive means in proportion to the resistance encountered by said feed drive means; and a cam, adapted to guide the tool-holding element along a predetermined path.

13. A lathe comprising in combination, a pair of carriages adapted to be moved along intersecting paths; a tool support mounted on one of said carriages; a tool mounted in said tool support; separate rotatable means for controlling the movement of each of said carriages along its respective path; a common drive for rotating either of said separate rotatable means; means for guiding said carriages in accordance with a predetermined pattern; and means independent of the drive between said separate rotatable means and said common means but operated by said common means and adapted to be connected to both of said rotatable means for selectively rotating said rotatable means at rates necessary to cause said tool to follow said predetermined pattern.

14. A lathe as claimed in claim 13, in which the independent means comprises a differential gear unit.

15. A lathe as claimed in claim 13, in which the independent means comprises a differential gear unit; and a cam for guiding said tool support along a predetermined path.

16. In a machine tool comprising in combination, a pair of rotatable shafts for moving a tool head along a pair of intersecting paths; a feedworks transmission for driving said shafts in a positive manner; and an attachment adapted to be removably mounted in cooperating position relatively to said feedworks transmission including means driven by said feedworks but separate from the drive between said feedworks and said shafts, said means being adapted to drive said shafts in proportion to the resistance they encounter in moving said tool head along a predetermined path.

17. In a machine tool comprising in combination, a pair of rotatable shafts for moving a tool head along a pair of intersecting paths; a feedworks transmission for driving said shafts in a positive manner; and an attachment adapted to be removably mounted in cooperating position relatively to said feedworks transmission; a differential associated with said attachment adapted to be driven by said feedworks transmission but independent of the drive between said feedworks and said shafts; and means for connecting said differential to, and for disconnecting it from said shafts.

18. In a machine tool comprising in combination separate rotatable shafts for moving a tool head along separate intersecting paths; a feedworks transmission including common means for driving said separate shafts; an attachment for said machine tool adapted to be removably mounted in cooperating position relatively to said feedworks transmission; a differential unit associated with said attachment and geared to said shafts, said unit being adapted to be driven by said common means but independent of the drive between said common means and said shafts; and a reversing mechanism between said unit and one of said shafts.

EDWARD P. BULLARD, III.